(12) United States Patent
Nambu

(10) Patent No.: US 12,242,918 B2
(45) Date of Patent: Mar. 4, 2025

(54) EGG INFORMATION MANAGEMENT SYSTEM

(71) Applicant: NABEL CO., LTD., Kyoto (JP)

(72) Inventor: Takahiko Nambu, Kyoto (JP)

(73) Assignee: NABEL CO., LTD., Kyoto (JP)

( * ) Notice: Subject to any disclaimer, the term of this patent is extended or adjusted under 35 U.S.C. 154(b) by 0 days.

(21) Appl. No.: 18/260,736

(22) PCT Filed: Jan. 7, 2022

(86) PCT No.: PCT/JP2022/000332
§ 371 (c)(1),
(2) Date: Jul. 7, 2023

(87) PCT Pub. No.: WO2022/153934
PCT Pub. Date: Jul. 21, 2022

(65) Prior Publication Data
US 2024/0303452 A1    Sep. 12, 2024

(30) Foreign Application Priority Data

Jan. 12, 2021  (JP) ................. 2021-002949

(51) Int. Cl.
*G06K 7/14* (2006.01)
*H04Q 9/00* (2006.01)

(52) U.S. Cl.
CPC ............ *G06K 7/1413* (2013.01); *H04Q 9/00* (2013.01)

(58) Field of Classification Search
CPC ....... G06K 7/1413; G06K 7/1417; H04Q 9/00
See application file for complete search history.

(56) References Cited

U.S. PATENT DOCUMENTS

2014/0261189 A1    9/2014  Chait
2016/0221699 A1*   8/2016  Phillips ................. H04L 12/66

FOREIGN PATENT DOCUMENTS

| CN | 106945867 A | 7/2017 |
| CN | 107410093 A | 12/2017 |
| CN | 210000906 U | 1/2020 |
| EP | 2 992 758 A1 | 3/2016 |
| JP | 2002245139 A * | 8/2002 |
| JP | 2013-112519 A | 6/2013 |
| JP | 2016-055938 A | 4/2016 |
| JP | 2016-074544 A | 5/2016 |

(Continued)

OTHER PUBLICATIONS

International Search Report issued in PCT/JP2022/000332; mailed Mar. 8, 2022.

(Continued)

*Primary Examiner* — Laura A Gudorf
(74) *Attorney, Agent, or Firm* — Studebaker & Brackett PC

(57) ABSTRACT

An egg information management system of the present disclosure is a system that manages information of eggs that are produced in a farm, placed on a utensil attached with a unique identification tag, and transported to a sorting place. The information management system manages information concerning the farm transmitted to a cloud system that is accessible both from a farm side user device and a sorting place side user device, and information concerning weight of eggs placed on the utensil in association with the unique identification tag.

3 Claims, 7 Drawing Sheets

(56) References Cited

FOREIGN PATENT DOCUMENTS

JP      2019-011203 A    1/2019
WO    2016/123149 A1   8/2016

OTHER PUBLICATIONS

The extended European search report issued by the European Patent Office on Oct. 28, 2024, which corresponds to European Patent Application No. 22739343.6-1218 and is related to U.S. Appl. No. 18/260,736.

* cited by examiner

FIG.6

| PALLET ID | LAST UPDATED | STATUS | RACK NUMBER | WEIGHT (kg) | NUMBER OF EGGS | EGG COLLECTION DATE | RAW MATERIAL EGG | FARM | SHIPPING DESTINATION | ... |
|---|---|---|---|---|---|---|---|---|---|---|
| 0001 | 12.14 20:00 | MEASUREMENT COMPLETED | - | 648.0 | 10800 | 2020/12/14 | NORMAL | A | ○○GP | ... |
| 0002 | 12.16 17:06 | IN WAREHOUSE | xxx | 692.1 | 10800 | 2020/12/14 | NORMAL | B | ●●GP | ... |
| 0003 | 12.14 17:48 | DISCHARGED | xxx | 700.1 | 10800 | 2020/12/12 | NORMAL | B | ●●GP | ... |
| 0004 | 12.14 17:49 | DISCHARGED | xxx | 691.2 | 10800 | 2020/12/12 | NORMAL | A | △△GP | ... |
| 0005 | 12.14 19:00 | IN WAREHOUSE | xxx | 572.4 | 10800 | 2020/12/12 | NORMAL | A | ●●GP | ... |
| 0006 | 12.05 09:36 | PALLETIZER | - | - | 10800 | 2020/12/05 | NORMAL | C | ○○GP | ... |
| ... | ... | ... | ... | ... | ... | ... | ... | ... | ... | ... |

FIG.7

CURRENT STATUS

| PALLETIZER | MEASUREMENT COMPLETED | IN WAREHOUSE | DISCHARGED |
|---|---|---|---|
| xxx kg | xxx kg | xxx kg | xxx kg |
| xxx EGGS | xxx EGGS | xxx EGGS | xxx EGGS |
| xxx PALLETS | xxx PALLETS | xxx PALLETS | xxx PALLETS |

RESULTS OF TODAY

| PALLETIZER | MEASUREMENT COMPLETED | IN WAREHOUSE | DISCHARGED |
|---|---|---|---|
| xxxxxx kg | xxxxxx kg | xxxxxx kg | xxxxxx kg |
| xxxxxx EGGS | xxxxxx EGGS | xxxxxx EGGS | xxxxxx EGGS |
| xxxxxx PALLETS | xxxxxx PALLETS | xxxxxx PALLETS | xxxxxx PALLETS |

RESULTS OF YESTERDAY

| PALLETIZER | MEASUREMENT COMPLETED | IN WAREHOUSE | DISCHARGED |
|---|---|---|---|
| xxxxxx kg | xxxxxx kg | xxxxxx kg | xxxxxx kg |
| xxxxxx EGGS | xxxxxx EGGS | xxxxxx EGGS | xxxxxx EGGS |
| xxxxxx PALLETS | xxxxxx PALLETS | xxxxxx PALLETS | xxxxxx PALLETS |

EGG INFORMATION MANAGEMENT SYSTEM

TECHNICAL FIELD

The present disclosure relates to an egg information management system.

BACKGROUND ART

Eggs collected in a production farm are placed on a utensil such as a pallet in the state that the eggs are accommodated in stacked trays. Then the eggs are transported from the production farm by a truck or the like to a place where a sorting device is situated, and are sometimes stored in a warehouse until they undergo a sorting process (see, for example, PTL 1). At the time of shipping from the production farm, at the time of unloading from the truck, and at the time of warehousing, the user or the like needs to enter or input information concerning eggs on the utensil every time.

CITATION LIST

Patent Literature

PTL 1: Japanese Patent Laying-Open No. 2016-55938

SUMMARY OF THE INVENTION

Technical Problem

The operation of entering or inputting information about eggs by the user or the like takes time and labor, and an input mistake can occur. Especially, the burden at the time of unloading from a truck was significant.

It is an object of the present disclosure to provide an egg information management system capable of accurately notifying information about eggs to be transported from a farm side to a sorting place side without time and labor.

Solution to Problem

The egg information management system of the present disclosure is a system that manages information of eggs that are produced in a farm, placed on a utensil attached with a unique identification tag, and transported to a sorting place. The egg information management system includes a cloud system that is accessible from both of a farm side user device, and a sorting place side user device. The cloud system manages while associating farm information concerning farm transmitted from the farm side user device, and weight information concerning weight of eggs placed on the utensil with the unique identification tag.

Advantageous Effects of Invention

According to the present disclosure, it is possible to provide an egg information management system capable of accurately notifying information about eggs to be transported from a farm side to a sorting place side without time and labor.

The foregoing and other objects, features, aspects and advantages of the present disclosure will become more apparent from the following detailed description of the present disclosure when taken in conjunction with the accompanying drawings.

BRIEF DESCRIPTION OF DRAWINGS

FIG. 6 is a chart showing one example of contents displayed on a display unit of a user device according to the embodiment.

FIG. 7 is a chart showing one example of contents displayed on a display unit of a user device according to the embodiment.

DESCRIPTION OF EMBODIMENTS

Hereinafter, by referring to FIG. 1 to FIG. 7, a present embodiment is described.

Figure 1:
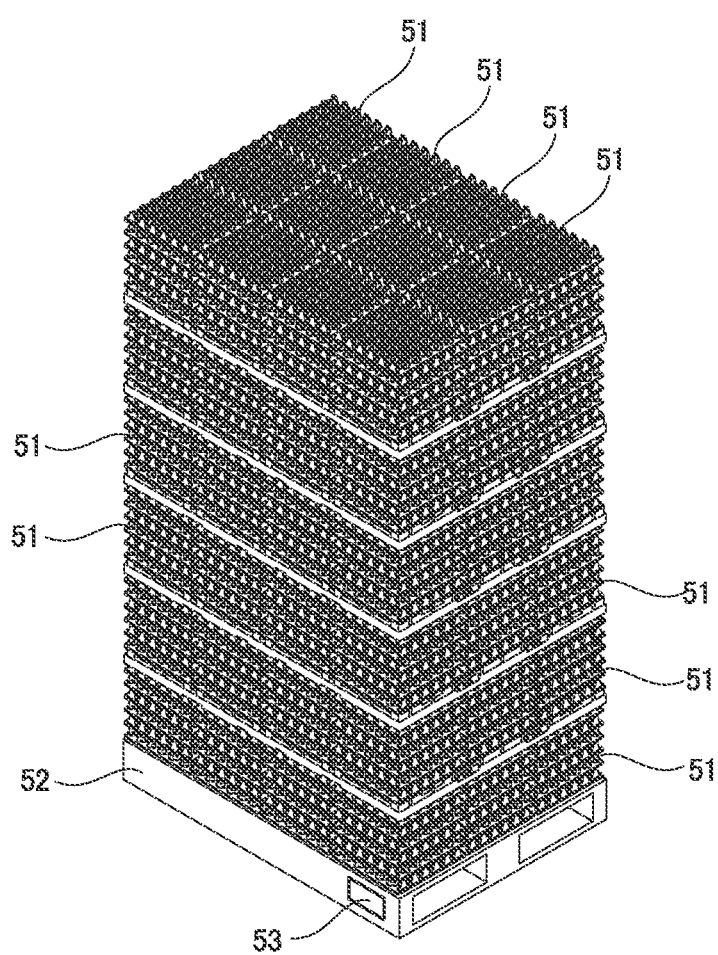
FIG. 1 is a perspective view showing the state that trays are stacked on a utensil according to a present embodiment.

Eggs are produced in a farm 41 having a poultry house. In farm 41, eggs are collected, and packed into a tray 51. Trays 51 are stacked in units of, for example, six trays. Trays 51 are placed on a utensil 52 using a transfer device 61 called a palletizer. As shown in FIG. 1, a plurality of trays 51 is arranged on utensil 52. In FIG. 1, eggs are not illustrated. A unique identification tag 53 is attached to utensil 52. Unique identification tag 53 is, for example, a barcode. Utensil 52 is, for example, a so-called pallet, and up to 10,800 eggs are placed while being interposed by dividers.

Figure 2:
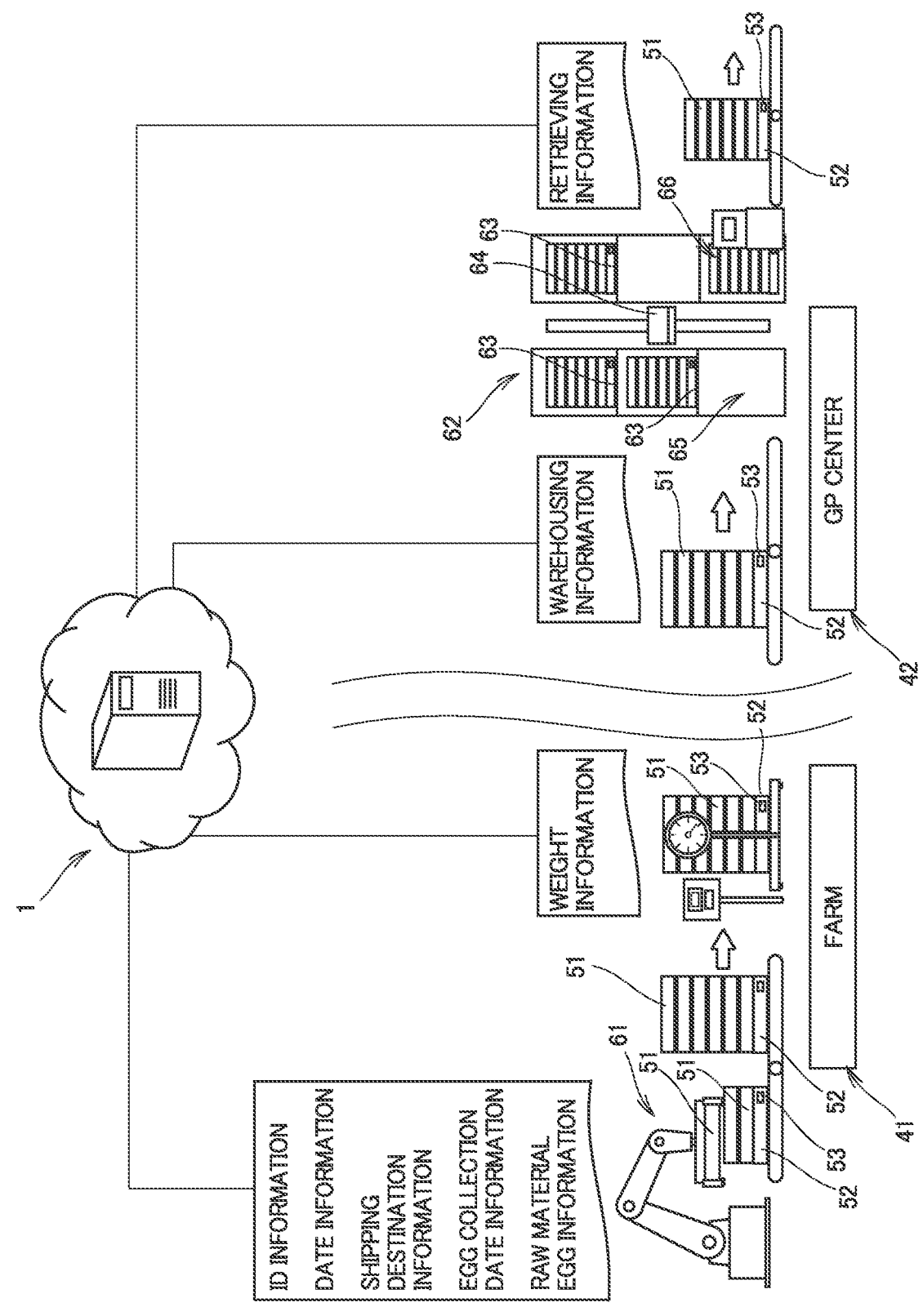
FIG. 2 is a diagram showing a business model of the egg information management system according to the embodiment.

As shown in FIG. 2, eggs placed on utensil 52 are weighed in farm 41. That is, a total weight of eggs, trays 51 and utensil 52 is measured.

After measurement, eggs placed on utensil 52 are loaded, for example, on a truck, and transported to a sorting place 42 called a GP (Grading & Packing) center. Eggs placed on utensil 52 may be transported to sorting place 42 via a ship, an airplane or an electric train after being loaded on a truck or a container. After measurement, eggs may be temporarily stored in a farm side warehouse (not shown) before being shipped to sorting place 42.

In sorting place 42, eggs transported from farm 41 are received. Eggs placed on utensil 52 are stored in a warehouse 62 in sorting place 42. Warehouse 62 is, for example, automated warehouse 62 having a storage rack 63, a stacker crane 64, a warehousing opening 65, and a retrieving opening 66. Eggs placed on utensil 52 are warehoused through warehousing opening 65. Eggs placed on utensil 52 are retrieved from the warehouse through retrieving opening 66 in response to a retrieving request.

Figure 3:
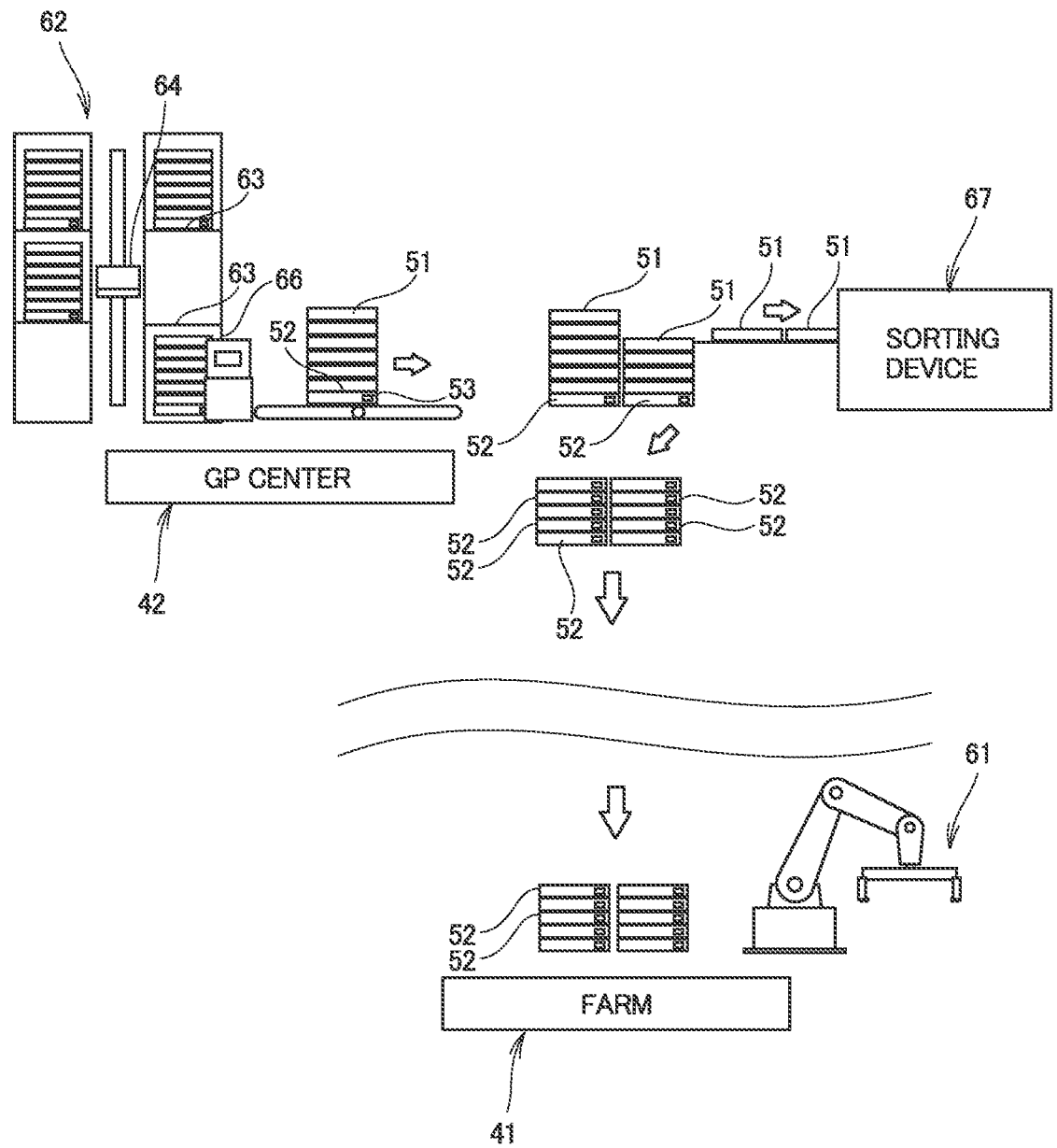
FIG. 3 is a diagram showing a business model of the egg information management system according to the embodiment.

As shown in FIG. 3, retrieved eggs are sorted in a sorting device 67. Eggs retrieved from warehouse 62 are unloaded from utensil 52 while they are placed on trays 51. Trays 51 are unstacked, for example, into single trays by an unstacking device (not shown). Further, each egg is transferred from tray 51 to a conveyor (not shown), for example, by a transfer device (not shown). Sorting device 67 conducts sorting, for example, by examining each egg conveyed by the conveyor, and weighing each egg. On the other hand, for example, utensils 52 from which trays 51 have been unloaded are stacked, for example, in units of a plurality of utensils 52 and returned to farm 41, and used again for transporting eggs from farm 41 to sorting place 42.

An egg information management system 1 according to the present embodiment is a system that manages information of eggs that are produced in farm 41, placed on utensil 52 attached with unique identification tag 53, and transported to sorting place 42. In the present embodiment, egg information management system 1 used in more than one farm 41 and more than one sorting place 42 is employed in the application under the egg distribution environment as shown in FIG. 2. Egg information management system 1 assists management of eggs using cloud computing, and is a cloud system that is accessible from both a farm side user device 2, and a sorting place side user device 3.

Figure 4:
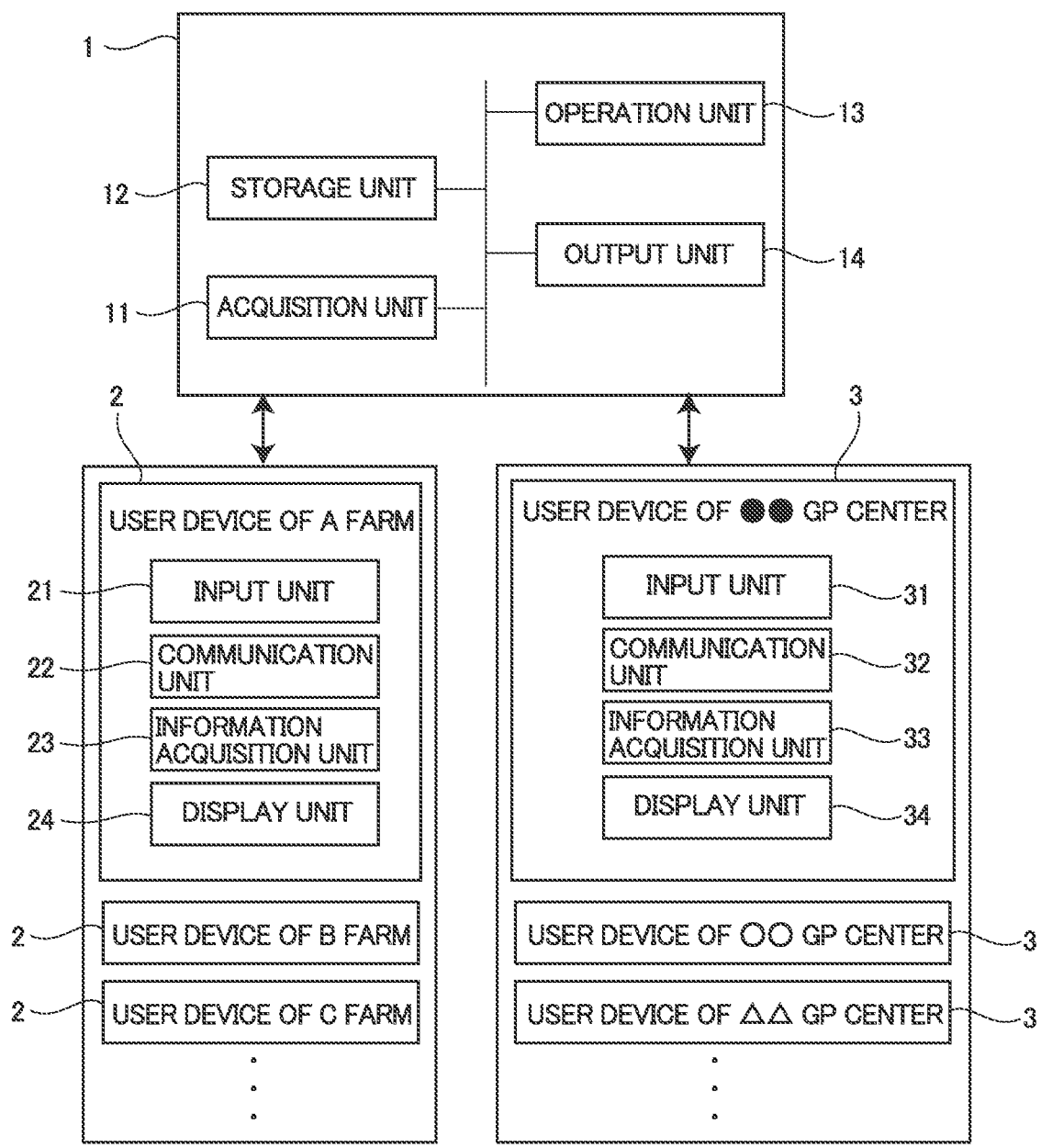
FIG. 4 is a block diagram of the egg information management system according to the embodiment.
Figure 5:
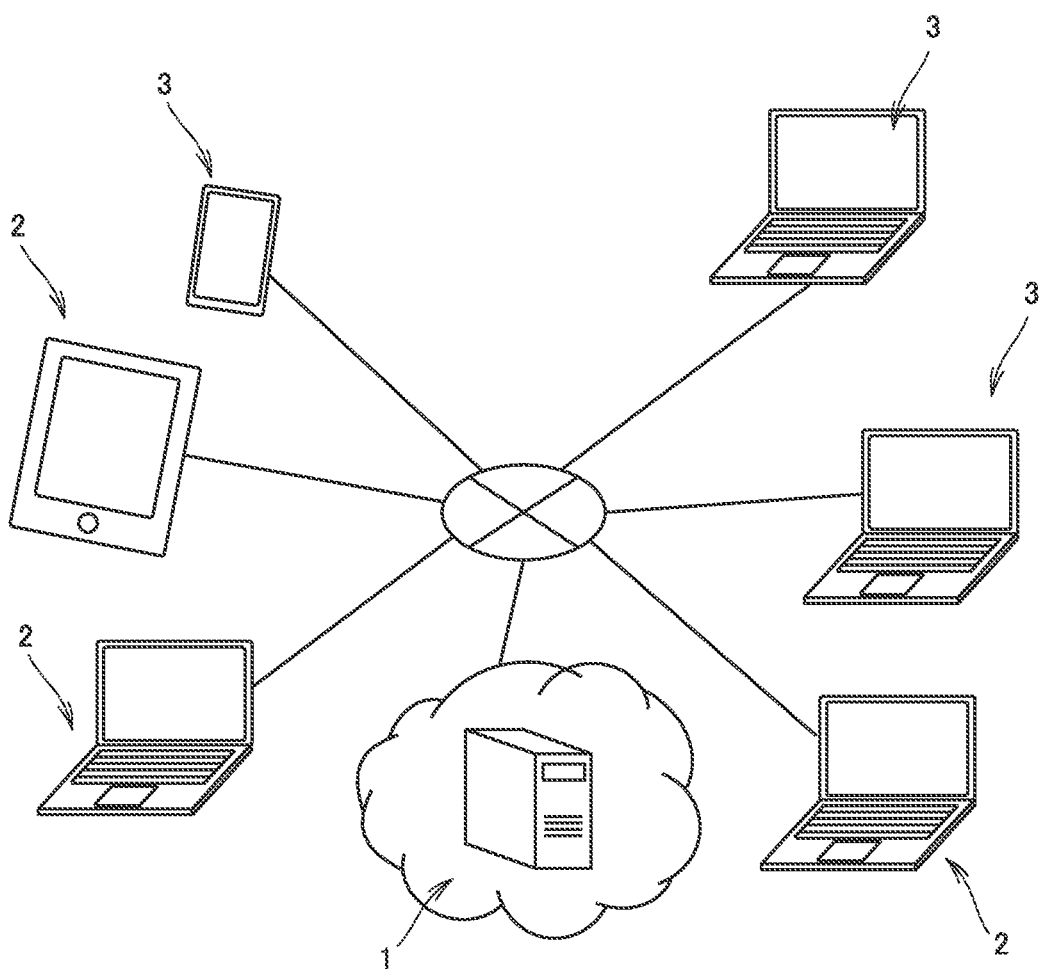
FIG. 5 is a schematic diagram schematically showing a configuration example of the egg information management system according to the embodiment.

As shown in FIG. 4, information acquired in farm 41 is stored in egg information management system 1. Information acquired in sorting place 42 is stored in egg information management system 1. As shown in FIG. 5, farm side user device 2, sorting place side user device 3, and egg information management system 1 are, for example, connected in a mutually communicable manner via a network such as the Internet.

As shown in FIG. 4, egg information management system 1 includes an acquisition unit 11, a storage unit 12, an operation unit 13, and an output unit 14. Acquisition unit 11, storage unit 12, operation unit 13, and output unit 14 may be configured by a physically integrated computer, and may be configured by physically separated computers. Egg information management system 1 is connected with more than one farm side user device 2, and more than one sorting place side user device 3 in a communicable manner via a network. More than one farm side user device 2 may be installed in one farm 41, and may be installed in different farms 41. More than one sorting place side user device 3 may be installed in one sorting place 42, or may be in different sorting places 42.

Acquisition unit 11 acquires ID information read on unique identification tag 53. For example, acquisition unit 11 may read a barcode that is unique identification tag 53 by means of a reader.

Acquisition unit 11 acquires information concerning farm 41. Information concerning farm 41 includes, for example, date information, shipping destination information, egg collection date information, raw material egg information, and so on. Also, acquisition unit 11 acquires information concerning weight of eggs placed on utensil 52. Information concerning farm 41, and information concerning weight of eggs placed on utensil 52 is input, for example, by a user of farm 41, and transmitted from farm side user device 2. As long as a weigh scale that measures the weight of eggs placed on utensil 52 is configured to be communicable with egg information management system 1 via a network, information concerning weight of egg may be transmitted from the weigh scale.

Also, acquisition unit 11 acquires information concerning warehouse 62. Examples of information concerning warehouse 62 include warehousing information and retrieving information. Warehousing information includes warehousing time, information concerning storage rack 63 in which eggs are stored after warehousing (for example, rack number) and so on. Retrieving information includes retrieving time and so on.

Storage unit 12 is a cloud storage that is accessible by authorized user devices 2, 3 including a producer in farm 41 and a producer in sorting place 42 via a network. Storage unit 12 stores information concerning farm 41 transmitted from farm side user device 2, and information concerning weight of eggs placed on utensil 52 in association with unique identification tag 53. Also, as shown in later-described FIG. 6 and the like, storage unit 12 may store (manage) information concerning warehouse 62 (warehouse information) and information concerning farm 41 (farm information), and weight information in association with a unique identification tag.

Operation unit 13 processes data for displaying status information of utensil 52. Specifically, operation unit 13 calculates the status of eggs placed on utensil 52 using information obtained in farm 41 and information obtained in sorting place 42. Status information includes information about whether or not weight of eggs placed on utensil 52 has been measured on the farm side, and information about whether or not eggs placed on utensil 52 are stored on the sorting place side. An operation result in operation unit 13 is stored in storage unit 12.

Output unit 14 outputs information stored in storage unit 12 to farm side user device 2 or to sorting place side user device 3.

Farm side user device 2 is, for example, a laptop PC, a desktop PC, a smart device, a tablet terminal and the like. User device 2 includes an input unit 21, a communication unit 22, an information acquisition unit 23, and a display unit 24. Input unit 21 receives input of information required for management. Communication unit 22 has a transmitting function of transmitting information input via input unit 21 to egg information management system 1 via a network, and a receiving function of receiving information output from egg information management system 1 via a network. Information acquisition unit 23 acquires information managed in association with unique identification tag 53 obtained via communication unit 22. Display unit 24 displays at least one of information input in input unit 21 and information acquired in information acquisition unit 23.

Sorting place side user device 3 is, for example, a laptop PC, a desktop PC, a smart device, a tablet terminal and the like. User device 3 includes an input unit 31, a communication unit 32, an information acquisition unit 33, and a display unit 34. Input unit 31 receives input of information required for management. Communication unit 32 has a transmitting function of transmitting information input via input unit 31 to egg information management system 1 via a network, and a receiving function of receiving information output from egg information management system 1 via a network. Information acquisition unit 33 acquires information managed in association with unique identification tag 53 obtained via communication unit 32. Specifically, information acquisition unit 33 acquires information concerning farm 41 and information concerning weight of eggs placed on utensil 52 on the basis of ID information read on unique identification tag 53. Display unit 34 displays at least one of information input in input unit 31 and information acquired in information acquisition unit 33.

Next, a method for using egg information management system 1 is described.

First, at the time of placement of tray 51 on utensil 52, unique identification tag 53 provided in utensil 52 is read by a reader. An operator inputs date information, shipping destination information, egg collection date information, and raw material egg information using input unit 21 of farm side user device 2. Information in which information concerning farm 41 is linked to pallet ID having one-to-one correspondence with each unique identification tag 53 is temporarily recorded in a temporary recording unit (not shown) or the like, and then transmitted to egg information management system 1 via a network.

Operation unit 13 conducts a processing for converting information received via acquisition unit 11 to data for displaying status information of utensil 52. In this manner, data as shown in FIG. 6 is generated. Operation unit 13 sets an item regarding status at "palletizer". That is, the status information indicating that weight of eggs placed on utensil 52 has not been measured on the farm side is recorded. In storage unit 12, an item regarding status, and items of last updated date, number of eggs, egg collection date, raw material egg, farm, and shipping destination are linked to pallet ID and stored.

Next, in the state that trays 51 are placed on utensil 52, a total weight of eggs placed on one utensil 52 is measured. At this time, unique identification tag 53 provided in utensil 52 is again read by a reader. An operator inputs weight information using input unit 21 of farm side user device 2. Information in which information concerning weight of eggs placed on utensil 52 is linked to pallet ID having one-to-one correspondence with each unique identification tag 53 is temporarily recorded in a temporary recording unit or the like, and then transmitted to egg information management system 1 via a network.

Operation unit 13 conducts a processing for converting information received via acquisition unit 11 to data for displaying status information of utensil 52, and changes the item regarding status from "palletizer" to "measurement completed". That is, the status information indicating that weight of eggs placed on utensil 52 has been measured on the farm side is recorded. In storage unit 12, an item regarding status, and items of last updated date, and weight are linked to pallet ID and stored.

Next, eggs are placed on utensil 52, and transported to sorting place 42. Eggs transported to sorting place 42 are temporarily stored in warehouse 62 in the state that trays 51 are placed on utensil 52. At the time of receiving into warehouse 62 after being unloaded from a truck, unique identification tag 53 provided in utensil 52 is read again by a reader. An operator inputs warehousing information by using input unit 31 of sorting place side user device 3. Information in which warehousing information is linked to pallet ID having one-to-one correspondence with each unique identification tag 53 is temporarily recorded in a temporary recording unit or the like, and then transmitted to egg information management system 1 via a network.

Operation unit 13 conducts a processing for converting information received via acquisition unit 11 to data for displaying status information of utensil 52, and changes the item regarding status from "measurement completed" to "in warehouse". That is, the status information indicating that eggs placed on utensil 52 are stored on the sorting place side is recorded. In storage unit 12, an item regarding status, and items of last updated date, and rack number are linked to pallet ID and stored.

Next, at the time of retrieval from warehouse 62, unique identification tag 53 provided in utensil 52 is again read by a reader. An operator inputs retrieving information by using input unit 31 of sorting place side user device 3. Information in which retrieving information is linked to pallet ID having one-to-one correspondence with each unique identification tag 53 is temporarily recorded in a temporary recording unit or the like, and then transmitted to egg information management system 1 via a network.

Operation unit 13 conducts a processing for converting information received via acquisition unit 11 to data for displaying status information of utensil 52, and changes the item regarding status from "in warehouse" to "discharged". That is, the status information indicating that eggs placed on utensil 52 have been removed from the storage place on the sorting place side is recorded. In storage unit 12, an item regarding status, and an item of last updated date are linked to pallet ID and stored.

Operation unit 13 may conduct displaying as shown in FIG. 7 using data stored in storage unit 12. Here, "current status" is changed in real time. For eggs of which current status is "palletizer", a total weight of eggs, a total number of eggs, and a total number of pallets are displayed. The same applies for "measurement completed", "in warehouse", and "discharged".

As described above, egg information management system 1 according to the present embodiment is a system that manages information of eggs that are produced in farm 41, placed on utensil 52 attached with unique identification tag 53, and transported to sorting place 42. This system includes a cloud system that is accessible from both of farm side user device 2, and sorting place side user device 3. The cloud system manages while associating information concerning farm 41 transmitted from farm side user device 2, and information concerning weight of eggs placed on utensil 52 with unique identification tag 53. Therefore, it is possible to accurately notify information about eggs to be transported from the farm side to the sorting place side without time and labor.

Sorting place side user device 3 includes information acquisition unit 33 that acquires information concerning farm 41 and information concerning weight of eggs placed on utensil 52 on the basis of ID information read on unique identification tag 53.

Operation unit 13 that processes data for displaying status information of utensil 52 in display units 24, 34 of user devices 2, 3 is provided, and the status information indicates information about whether or not weight of eggs placed on utensil 52 has been measured on the farm side, and information about whether or not eggs placed on utensil 52 are stored on the sorting place side. Therefore, the current amounts of eggs on the farm side, eggs under transportation, and eggs on the sorting place side can be checked in real time both from the farm side and the sorting place side. This is very convenient.

The present disclosure is not limited to the above-described embodiment.

Information concerning farm 41, and information concerning weight of eggs placed on utensil 52 may be transmitted from the same farm side user device 2, and may be transmitted from farm side user devices 2 that are different from each other. User devices 2, 3 including input units 21, 31 that are mainly used for transmission and user devices 2, 3 including information acquisition units 23, 33 that are mainly used for reception may be separate from each other.

Examples of unique identification tag 53 include a one-dimensional code, a two-dimensional code, and an RF tag. Unique identification tag 53 may be visible from outside, and may be embedded in utensil 52.

The cloud system may be such a system that connects more than one farm side user device 2, and more than one sorting place side user device 3.

Sorting place 42 need not include automated warehouse 62, and egg information management system 1 need not acquire warehousing information or retrieving information from the sorting place side.

Embodiments disclosed herein are merely illustrative, and are not restrictive. The present disclosure is indicated by the appended claims rather than by the scope described above, and it is intended that all modifications within the equivalent meaning and scope of the claims are included.

INDUSTRIAL APPLICABILITY

The present disclosure can be applied to an egg information management system.

REFERENCE SIGNS LIST

1: egg information management system, 13: operation unit, 2: farm side user device, 24, 34: display unit, 3: sorting place side user device, 41: farm, 42: sorting place, 52: utensil, 53: unique identification tag

The invention claimed is:

1. An egg information management system that manages information of eggs that are produced in a farm, placed on a utensil attached with a unique identification tag and transported to a sorting place, the system comprising
   a cloud system that is accessible both from a user device on a farm side and a user device on a sorting place side,
   wherein the cloud system manages farm information concerning the farm transmitted from the user device on the farm side and weight information concerning weight of eggs placed on the utensil in association with the unique identification tag.

2. The egg information management system according to claim 1, wherein the user device on the sorting place side includes an information acquisition unit that acquires the farm information and the weight information according to identification (ID) information read on the unique identification tag.

3. The egg information management system according to claim 1, comprising
   an operation unit that processes data for displaying status information of the utensil in a display unit of the user device on the farm side and a display unit of the user device on the sorting place side,
   wherein the status information indicates at least one of information about whether or not weight of eggs placed on the utensil has been measured on the farm side, and information about whether or not eggs placed on the utensil are stored on the sorting place side.

* * * * *